United States Patent
Berger

(10) Patent No.: US 9,750,323 B2
(45) Date of Patent: Sep. 5, 2017

(54) SCISSOR LIFT THAT LOCKS AT A VARIABLE HEIGHT

(71) Applicant: Aviad Berger, Rehovot (IL)

(72) Inventor: Aviad Berger, Rehovot (IL)

(*) Notice: Subject to any disclaimer, the term of this patent is extended or adjusted under 35 U.S.C. 154(b) by 0 days.

(21) Appl. No.: 15/180,097

(22) Filed: Jun. 13, 2016

(65) Prior Publication Data
US 2016/0302545 A1 Oct. 20, 2016

Related U.S. Application Data

(63) Continuation of application No. 14/687,930, filed on Apr. 16, 2015, now Pat. No. 9,387,869.

(51) Int. Cl.
| | | |
|---|---|---|
| *A45C 15/00* | (2006.01) | |
| *B62B 3/06* | (2006.01) | |
| *B62B 3/02* | (2006.01) | |
| *A45C 5/03* | (2006.01) | |
| *B66F 7/06* | (2006.01) | |
| *B62B 3/00* | (2006.01) | |

(52) U.S. Cl.
CPC ............ *A45C 15/00* (2013.01); *A45C 5/03* (2013.01); *B62B 3/008* (2013.01); *B62B 3/022* (2013.01); *B62B 3/0625* (2013.01); *B66F 7/065* (2013.01); *B62B 2202/24* (2013.01); *B62B 2203/10* (2013.01); *B62B 2205/06* (2013.01); *B62B 2206/06* (2013.01)

(58) Field of Classification Search
CPC .......... A45C 15/00; A45C 5/03; B62B 3/008; B62B 3/022; B62B 3/0625; B62B 2202/24; B62B 2203/10; B62B 2205/06; B62B 2206/06; B66F 7/065

USPC ........................................................ 280/47.18
See application file for complete search history.

(56) References Cited

U.S. PATENT DOCUMENTS

| | | | | |
|---|---|---|---|---|
| 1,176,876 | A * | 3/1916 | Vartabedian ........... | A45C 5/143 190/18 A |
| 1,592,944 | A * | 7/1926 | Jones ..................... | B62B 3/022 248/129 |
| 2,581,023 | A * | 1/1952 | Jerick .................... | A47B 9/16 108/120 |
| 2,623,755 | A * | 12/1952 | Terry ..................... | B62B 3/022 211/202 |
| 2,805,905 | A * | 9/1957 | Levitan ................. | A47B 31/00 108/145 |
| 4,122,924 | A | 10/1978 | Wasserman | |

(Continued)

*Primary Examiner* — J. Allen Shriver, II
*Assistant Examiner* — Brian Cassidy

(57) ABSTRACT

A scissor lift for raising and lowering a heavy object, including an upper platform for supporting a heavy object, including a release mechanism, and guided rollers mounted on axles, a lower frame including guided rollers mounted on axles, a scissor lift mechanism fastened to the axles of the upper platform guided rollers and to the axles of the lower frame guided rollers, that raises and lowers the upper platform, a locking mechanism including protrusions protruding outward of the upper frame, each protrusion corresponding to a different height of the scissor lift mechanism, wherein at least one guided roller within the upper platform includes a spring-loaded pin for engagement in the protrusions, thereby locking the scissor lift mechanism into place at a height corresponding to the protrusion into which the spring-loaded pin is engaged, and a release mechanism that unlocks the scissor lift mechanism.

10 Claims, 11 Drawing Sheets

(56) References Cited

U.S. PATENT DOCUMENTS

| | | | |
|---|---|---|---|
| 4,221,280 A * | 9/1980 | Richards | B66F 7/065 187/269 |
| 4,249,749 A | 2/1981 | Collier | |
| 4,693,660 A * | 9/1987 | LaCroix | B62B 5/0083 187/244 |
| D302,618 S | 8/1989 | Gotteslig | |
| 5,002,293 A | 3/1991 | Gottselig | |
| 5,033,758 A * | 7/1991 | Levy | B62B 3/02 211/201 |
| 5,123,665 A | 6/1992 | Levy | |
| 5,324,064 A * | 6/1994 | Sumser | A47D 13/043 108/120 |
| 5,979,927 A * | 11/1999 | Hale | G02B 7/182 248/277.1 |
| 6,431,319 B1 | 8/2002 | Myers et al. | |
| 6,594,951 B1 | 7/2003 | Reynolds | |
| 6,929,250 B2 * | 8/2005 | Blake | B62B 1/002 254/122 |
| 7,249,771 B1 | 7/2007 | Brennan et al. | |
| 7,413,056 B2 * | 8/2008 | Gonzi | B66F 7/065 187/269 |
| 7,870,937 B1 | 1/2011 | Arnao | |
| 8,015,638 B2 * | 9/2011 | Shimada | A47C 19/04 108/145 |
| 8,052,120 B2 | 11/2011 | Bacon | |
| 8,172,255 B1 | 5/2012 | Martin | |
| 8,272,830 B2 * | 9/2012 | Kurita | B25J 9/0096 414/744.3 |
| 8,286,944 B2 * | 10/2012 | Rossato | B66F 7/0633 254/122 |
| 8,544,391 B2 * | 10/2013 | Knox | B60N 3/063 108/12 |
| 8,692,648 B2 * | 4/2014 | Dantas | B66F 7/065 187/211 |
| 8,770,549 B2 * | 7/2014 | Deuring | B66F 7/065 254/122 |
| 8,888,070 B2 * | 11/2014 | Olesen | A61G 5/1059 187/211 |
| 8,894,078 B2 * | 11/2014 | Brewin | B62B 7/04 280/649 |
| 8,967,658 B1 * | 3/2015 | Wang | B62B 3/025 248/97 |
| 9,045,152 B2 * | 6/2015 | Sekine | B60L 3/0076 |
| 9,056,621 B1 * | 6/2015 | Jin | B62B 3/027 |
| 9,072,645 B2 * | 7/2015 | Gamman | A61G 13/009 |
| 9,133,976 B2 * | 9/2015 | Lin | F16M 11/24 |
| 9,149,131 B2 * | 10/2015 | Taylor | A47F 3/14 |
| 9,162,696 B2 * | 10/2015 | Sekine | B62B 3/001 |
| 9,205,746 B2 * | 12/2015 | Sekine | B60L 3/0061 |
| 9,245,406 B2 * | 1/2016 | Fitzgerald | A47F 3/06 |
| 9,321,618 B2 * | 4/2016 | McIntosh | B66F 7/0608 |
| 9,326,598 B1 * | 5/2016 | West | A47B 3/02 |
| 9,340,398 B2 * | 5/2016 | Ruth sen. | B66F 7/065 |
| 9,371,083 B1 * | 6/2016 | Jones | B62B 3/16 |
| 9,540,220 B2 * | 1/2017 | Stewart | B66F 7/0625 |
| 2005/0140119 A1 | 6/2005 | Wong | |
| 2007/0278058 A1 | 12/2007 | Angel | |
| 2010/0012909 A1 * | 1/2010 | Lee | B66F 7/065 254/93 R |
| 2010/0243973 A1 * | 9/2010 | Deuring | B66F 3/22 254/122 |
| 2011/0204598 A1 * | 8/2011 | Stevenson | B62B 3/02 280/639 |
| 2012/0276620 A1 | 11/2012 | Kravitz et al. | |
| 2012/0288354 A1 | 11/2012 | Moore | |
| 2014/0014886 A1 * | 1/2014 | Ruth sen. | B66F 17/00 254/122 |
| 2014/0027693 A1 * | 1/2014 | Hallman | B66F 5/00 254/8 C |
| 2014/0248114 A1 * | 9/2014 | Sawyer | B60P 1/02 414/812 |
| 2014/0311843 A1 * | 10/2014 | Grignon | A45C 9/00 190/2 |
| 2014/0374680 A1 * | 12/2014 | Tsang | B66F 7/0658 254/7 C |
| 2015/0014609 A1 * | 1/2015 | Mohr | B66F 7/065 254/122 |
| 2015/0028787 A1 * | 1/2015 | Sekine | B66F 9/24 318/494 |
| 2015/0137055 A1 * | 5/2015 | Ong | B66F 5/025 254/7 B |
| 2015/0145224 A1 * | 5/2015 | Zhu | B62B 3/025 280/42 |
| 2015/0265016 A1 | 9/2015 | Cavalheiro | |
| 2015/0298949 A1 * | 10/2015 | Mohr | B66F 7/065 254/122 |
| 2015/0307335 A1 * | 10/2015 | Beebe | B66F 5/00 254/93 A |
| 2015/0314026 A1 | 11/2015 | Mauzerall et al. | |
| 2015/0321891 A1 * | 11/2015 | Mohr | B66F 7/28 254/122 |
| 2015/0336780 A1 | 11/2015 | Beyer et al. | |
| 2016/0159628 A1 * | 6/2016 | Mohr | B66F 7/065 254/122 |
| 2016/0195444 A1 * | 7/2016 | Benvenuti | B66F 7/065 73/122 |
| 2016/0200558 A1 * | 7/2016 | Nedelman | B65G 67/24 414/497 |

\* cited by examiner

SCISSOR LIFT THAT LOCKS AT A VARIABLE HEIGHT

PRIORITY REFERENCE

This application is a continuation of U.S. patent application Ser. No. 14/687,930, now U.S. Pat. No. 9,387,869, entitled LUGGAGE WITH MECHANICALLY INTEGRATED TROLLEY, and filed on Apr. 16, 2015 by inventor Aviad Berger.

FIELD OF THE INVENTION

The present invention relates to luggage, such as a suitcase, with an integrated trolley that raises and lowers the luggage.

BACKGROUND OF THE INVENTION

Conventional luggage trolleys have several drawbacks. A first drawback is that a traveler must either bring a trolley with him, or rely on a trolley being available when he needs one.

A second drawback is that a conventional trolley does not enable the traveler to lift his luggage. Often a traveler wants to put in item into his luggage or remove an item from his luggage when the luggage is on a trolley, and there is no way to do so other than to either bend down to reach the luggage, or lift the luggage from the trolley onto an elevated surface. Similarly, the traveler may be packing or unpacking his luggage while it is placed on an elevated surface, and there is no way to close the luggage and stand it on its wheels other than to lift the luggage from the elevated surface and lower it to the floor.

A third drawback is that conventional luggage, when dragged on its wheels by a traveler, leans towards the traveler and the traveler must bear some of the weight of the luggage.

A fourth drawback is that conventional luggage is pulled behind a traveler, and the traveler cannot see if the luggage collides with another traveler or an obstacle.

SUMMARY OF THE DESCRIPTION

Embodiments of the present invention overcome disadvantages of conventional luggage trolleys, by providing luggage with an integrated trolley that has a scissor lifting mechanism for raising and lowering the luggage on the trolley. The integrated trolley, when not in use, locks compactly to stow alongside a surface of the luggage for convenient transport. When the integrated trolley is locked, the traveler can pull the luggage along its wheels in a conventional manner.

Being integrated with the luggage, the trolley is always available to the traveler whenever he needs it. Having a lifting mechanism, the trolley raises the luggage, making it convenient for the traveler to insert an item into the luggage or remove an item from the luggage, and convenient for the traveler to wheel the luggage around while packing or unpacking the luggage.

The integrated trolley may be pushed or pulled like a cart, thereby relieving the traveler of bearing any weight of the luggage. Pushing the integrated trolley in front of the traveler enables the traveler to see where the luggage is being pushed and avoid collision with other travelers or obstacles.

The integrated trolley is lightweight, and thus avoids adding significant weight to the luggage.

There is thus provided in accordance with an embodiment of the present invention luggage with an integrated trolley, including a luggage unit, including a piece of luggage, a handle fastened to the piece of luggage, for pushing or pulling the piece of luggage, and luggage wheels fastened to a first outer surface of the piece of luggage, for rolling the piece of luggage when a trolley unit is in a stowed position, a trolley unit that has a stowed position and a non-stowed position, and that, when in the non-stowed position, locks and unlocks such that the trolley unit is free to be raised and lowered when it is unlocked, and is not free to be raised and lowered when it is locked, the trolley unit being fastened to the luggage unit in both the stowed and the non-stowed positions, and including a locking mechanism for locking the trolley unit, an upper trolley body fastened to a second outer surface of the piece of luggage, a scissor lift mechanism fastened to the upper trolley body, that raises and lowers the upper trolley body, a lower trolley body fastened to the lift mechanism, including trolley wheels for rolling the trolley unit when the trolley unit is in the non-stowed position, and guided rollers within the upper trolley body and guided rollers within the lower trolley body, for raising and lowering the lift mechanism when the trolley unit is unlocked, and a release mechanism extending from the luggage unit to the trolley unit through a slit in the piece of luggage, for unlocking the trolley unit.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

Table of elements in the figures

| Element | Description |
| --- | --- |
| 100 | luggage unit |
| 110 | luggage |
| 120 | handle for pushing/pulling the trolley |
| 125 | handle for pushing/pulling the luggage |
| 130 | luggage wheels |
| 140 | release lever to open trolley |
| 142 | rod connected to release lever |
| 143 | rod in luggage handle |
| 144 | inclined slideable block |
| 146 | spring |
| 148 | rod connected to slideable block |
| 149 | slit through which rod extends out of luggage |
| 150 | shaft to release engaged pin of guided roller |
| 155 | capped shaft pins |
| 200 | trolley unit |
| 210 | upper trolley body |
| 212 | studs for fastening luggage unit to trolley unit |
| 214 | Slit through which rollers of lift mechanism are guided |
| 215 | protrusions for engaging pin of guided roller |
| 220 | lower trolley body |
| 230 | lift mechanism |
| 240 | guided rollers for raising and lowering lift mechanism |
| 242 | axles of guided rollers |
| 245 | spring-loaded pin of guided roller |
| 250 | trolley wheels |
| 260 | axles for a trolley |

DETAILED DESCRIPTION

Embodiments of the present invention relate to luggage with an integrated trolley. The trolley locks and unlocks. The trolley includes a lifting mechanism that raises and lowers the luggage when the trolley is unlocked. The luggage rolls on a set of wheels when pulled by a luggage handle, in the raised and lowered positions. When not in use, the trolley folds to stow compactly along an outer surface of the luggage. The luggage rolls on a different set of wheels when the trolley is not in use.

Figure 11:
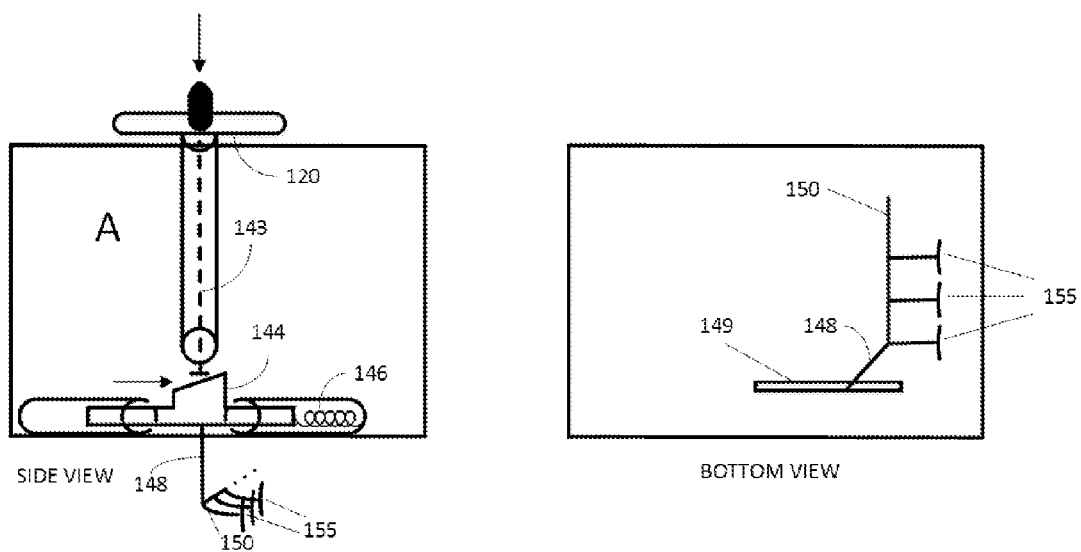
FIG. 11 is a simplified view, from the side and from the bottom of the luggage, of a release mechanism, for releasing a guided roller pin from its engaged position by means of a handle bar, in accordance with an alternate embodiment of the present invention.

The integrated luggage and trolley includes four primary components, as described in detail below; namely, a luggage unit, a trolley unit, a lock mechanism and a release mechanism. The luggage unit includes a piece of luggage, a luggage handle and luggage wheels. The trolley unit includes a lift mechanism for raising and lowering the trolley unit, and trolley wheels. The luggage unit may be used with or without the trolley unit. The trolley unit folds to a stowed position, for convenient stowage when not in use, and unfolds to a non-stowed position when in use. The luggage and trolley units are shown in FIGS. 1-4 and 10. The lift mechanism of the trolley unit may be locked in place, in which case the trolley unit cannot be freely raised and lowered. The lock mechanism locks the lift mechanism, is situated within the trolley unit, and is shown in FIGS. 5-8. The release mechanism unlocks the lift mechanism of the trolley unit, so that the trolley unit may be freely raised and lowered. The release mechanism extends from the luggage unit to the trolley unit through a slit in the piece of luggage, and is shown in FIGS. 9 and 11.

Luggage and Trolley Units

Figure 1:
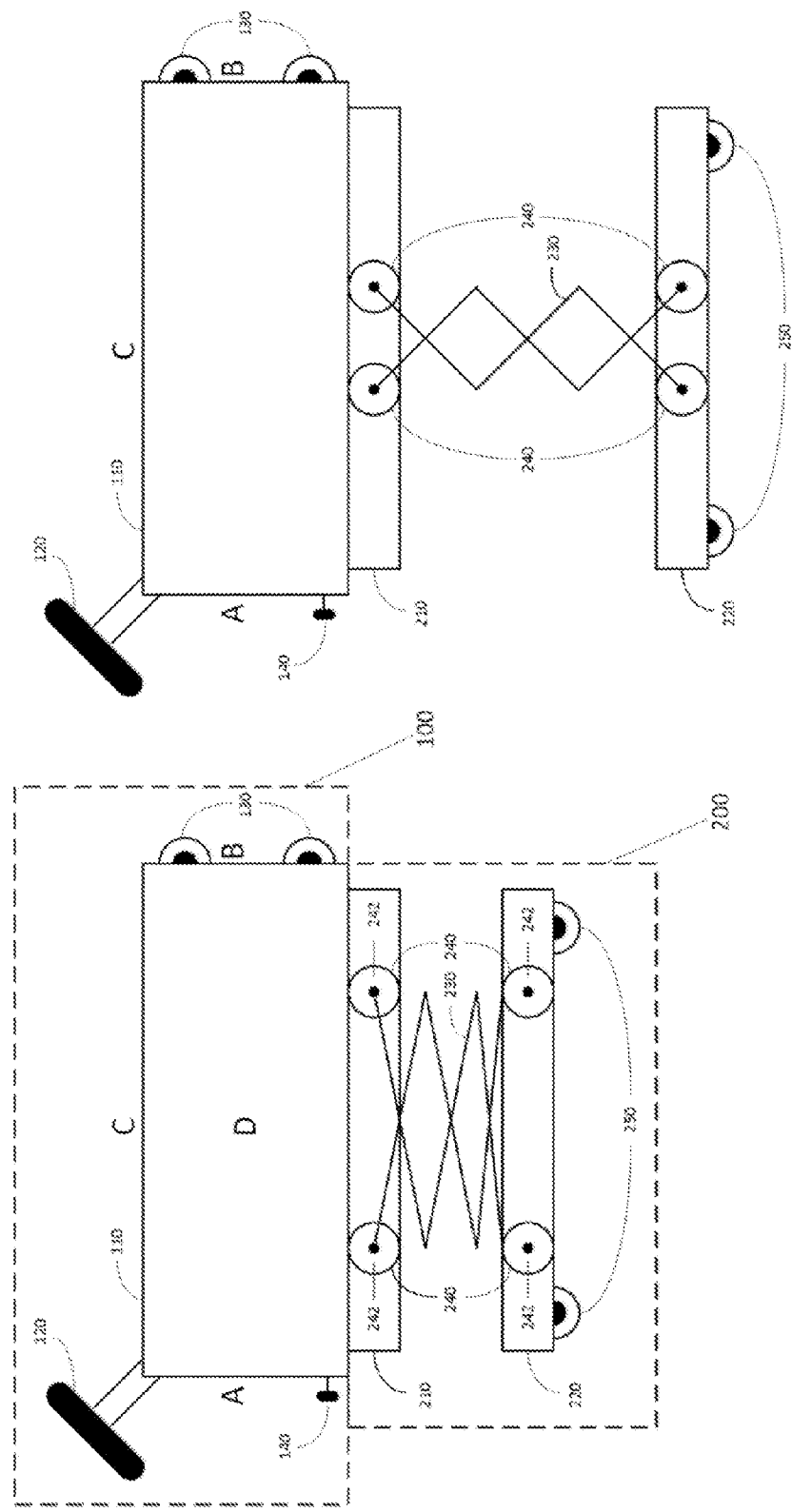
FIG. 1 is a simplified front view of luggage with an integrated trolley, in non-stowed raised and lowered positions, in accordance with an embodiment of the present invention.

Reference is made to FIG. 1, which is a simplified front view of luggage with an integrated trolley, in a non-stowed raised position at the left of FIG. 1 and in a non-stowed lowered position at the right of FIG. 1, in accordance with an embodiment of the present invention. Shown in FIG. 1 is a luggage unit 100 including a piece of luggage 110 having a luggage handle 120 for pushing or pulling luggage 110. From the viewpoint of FIG. 1, the outer left, right, top and front faces of luggage 110 are designated respectively as A, B, C and D.

Luggage unit 100 is fastened to a trolley unit 200 that locks and unlocks. Trolley unit 200 has an upper trolley body 210, a lower trolley body 220, and a scissor lift mechanism 230 fastened between upper trolley body 210 and lower trolley body 220. Guided rollers 240 control raising and lowering of lift mechanism 230. Lift mechanism 230 is fastened to rollers 240 via axles 242 of the rollers. Trolley wheels 250 are fastened underneath lower trolley body 220, and serve to roll luggage 110 when luggage handle 120 is pushed or pulled.

Figure 2:
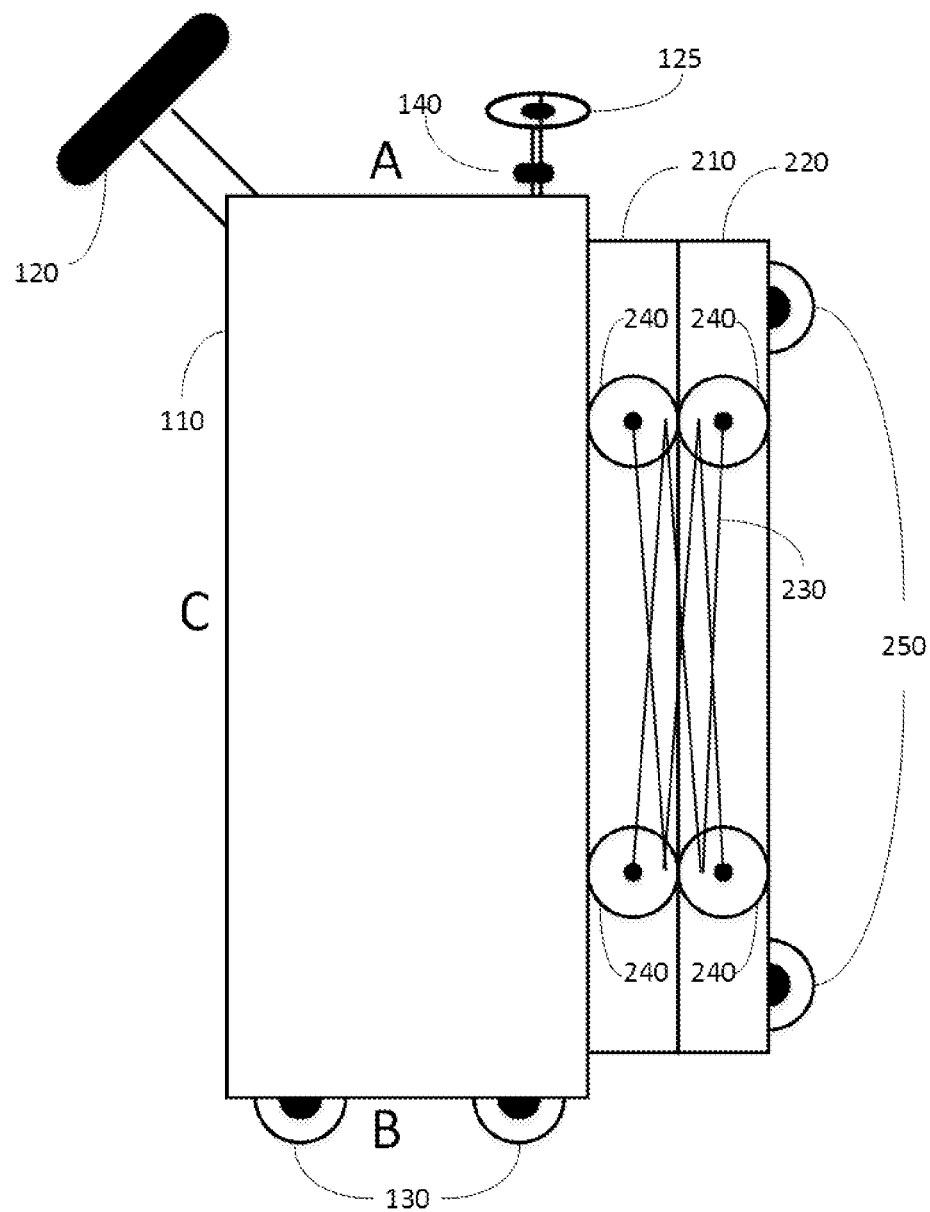
FIG. 2 is a simplified front view of the luggage with the integrated trolley in a stowed position, in accordance with an embodiment of the present invention.

Luggage wheels 130 serve to roll luggage 110 when trolley unit 200 is folded, by pushing or pulling on luggage handle 125 (shown in FIG. 2).

A release lever 140 on luggage 110 serves to unlock trolley unit 200 from its locked position. While lever 140 is lifted by a traveler, trolley unit 200 is released from its locked position, and lift mechanism 230 is free to raise and lower. When the traveler stops lifting lever 140, trolley unit 200 locks into place at its current position. Operation of release lever 140 is described below with reference to FIG. 9.

Reference is made to FIG. 2, which is a simplified front view of the luggage with the integrated trolley in a stowed position, in accordance with an embodiment of the present invention, in accordance with an embodiment of the present invention. FIG. 2 shows that trolley upper body 210 and trolley lower body 220 rest together compactly along an outer surface of luggage unit 100, when trolley unit 200 is folded, for convenient stowage of the trolley when it is not in use. In accordance with an embodiment of the present invention, folding of trolley unit 200 is performed by locking the trolley unit into place when lift mechanism 230 is lowered as much as possible. As seen from the relative positions of the faces A, B and C, the luggage in FIG. 2 is rotated 90° and flipped vis-à-vis the luggage in FIG. 1, since the luggage of FIG. 2 rolls along luggage wheels 130, whereas the luggage of FIG. 1 rolls along trolley wheels 250.

It will be appreciated by those skilled in the art that trolley unit 200 may optionally include a latch (not shown) to fasten trolley upper body 210 and trolley lower body 220 together when the trolley unit is stowed.

Figure 3:
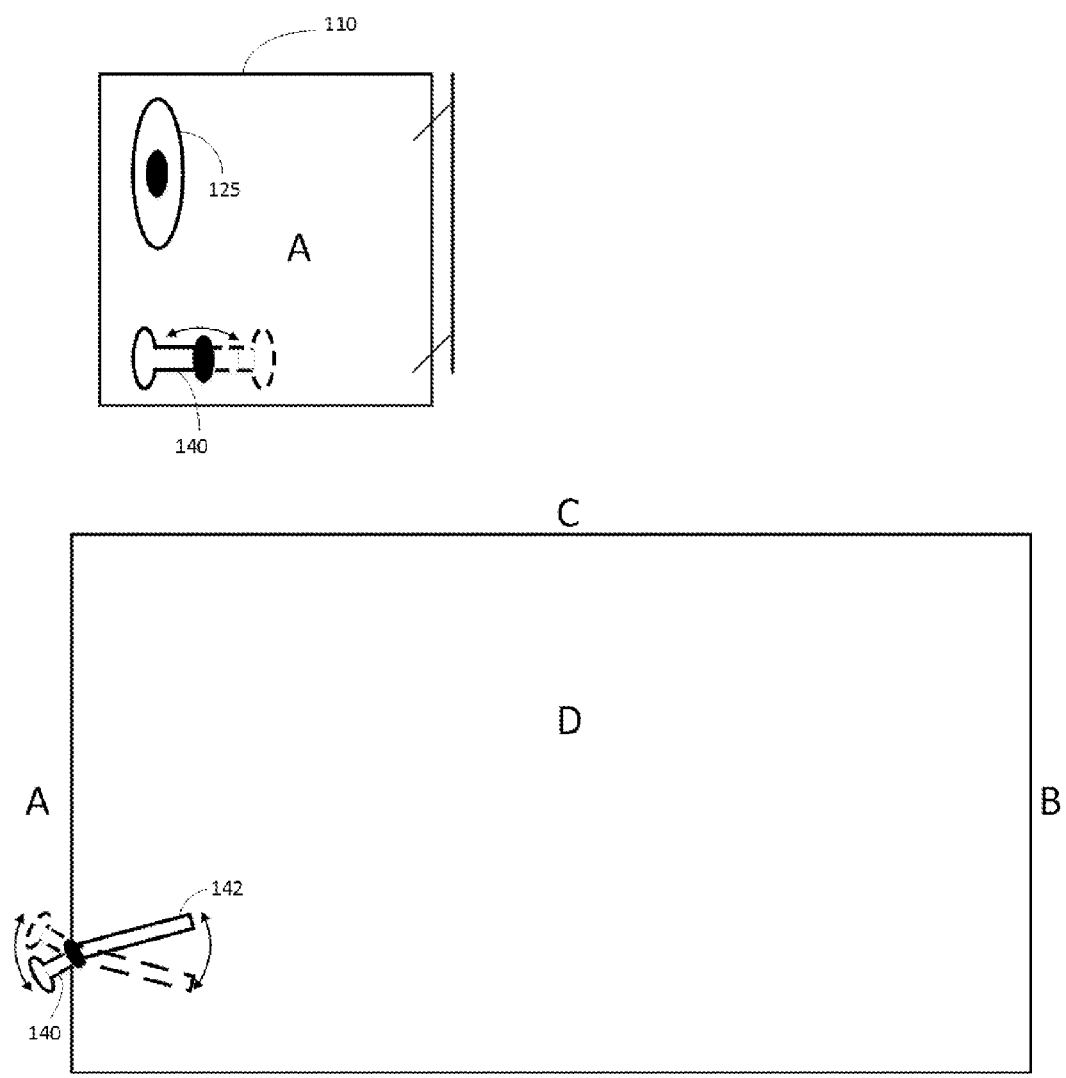
FIG. 3 is a simplified side view of the luggage of FIG. 1, showing a release lever to unlock the trolley, in accordance with an embodiment of the present invention.

Reference is made to FIG. 3, which is a simplified side view of the luggage of FIG. 1, showing release lever 140 that unlocks the trolley, in accordance with an embodiment of the present invention. The side view appears at the top of FIG. 3 and, as can be seen at the bottom of FIG. 3, release lever 140 connects to a rod 142 inside luggage 110. Operation of release lever 140 and rod 142 is described below with reference to FIG. 9.

Figure 4:
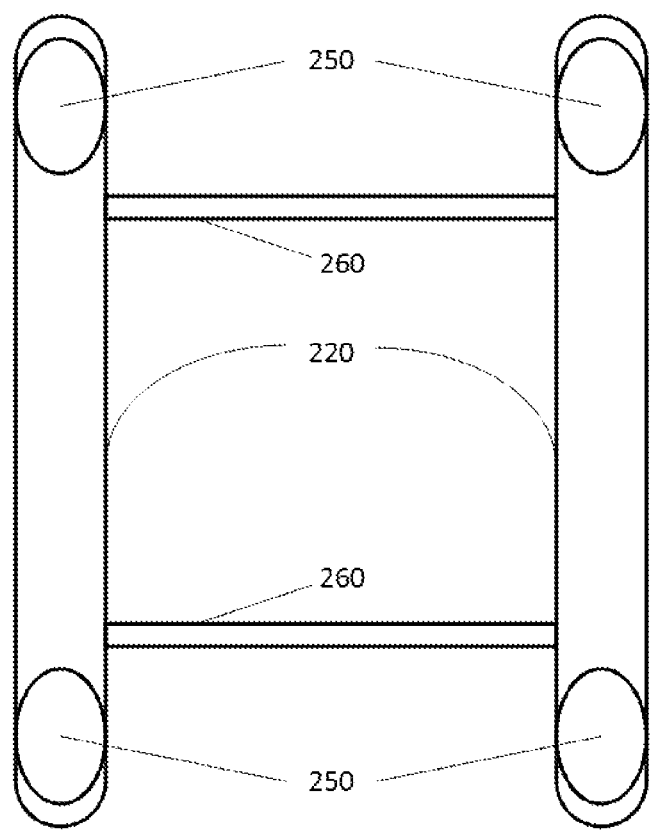
FIG. 4 is a simplified bottom view of the luggage and trolley of FIG. 1, in accordance with an embodiment of the present invention.

Reference is made to FIG. 4, which is a simplified bottom view of the luggage and trolley of FIG. 1, in accordance with an embodiment of the present invention. Shown in FIG. 4 are axles 260 joining front and back parts of lower trolley body 220.

Lock Mechanism

Figure 5:
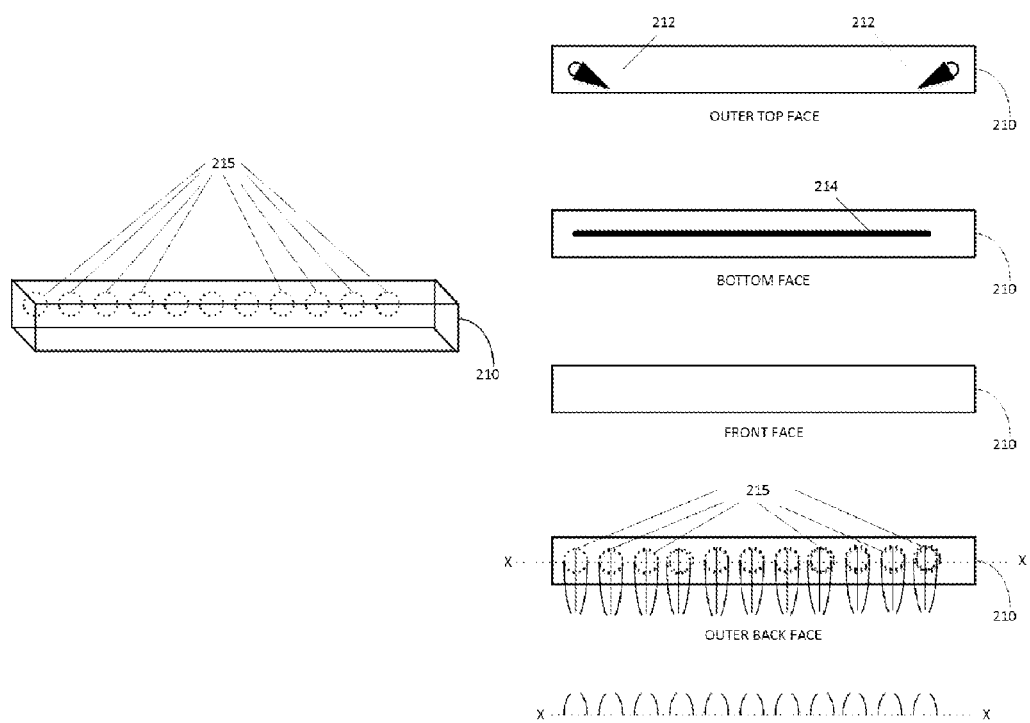
FIG. 5 is a simplified perspective view of an upper trolley body, in accordance with an embodiment of the present invention.

Reference is made to FIG. 5, which is a simplified perspective view of upper trolley body 210, in accordance with an embodiment of the present invention. As shown in FIG. 5, the outer top face of upper trolley body 210 includes studs 212 for fastening luggage 110 to upper trolley body 210. The bottom face of upper trolley body 210 includes a slit 214 through which the top of scissor of lift mechanism 230 moves back and forth. The outer back face of upper trolley body 210 includes protrusions 215 in which a spring-loaded pin of a guided roller 240 is securely engaged when the trolley unit is locked, as described below.

FIG. 5 also shows a cross-section of protrusions 215 extending out of a line X-X in the outer back face of upper trolley body 210.

It will be appreciated by those skilled in the art that slit 214 may alternatively be located on the front face of upper trolley body 214, instead of on the bottom face.

Figure 6:
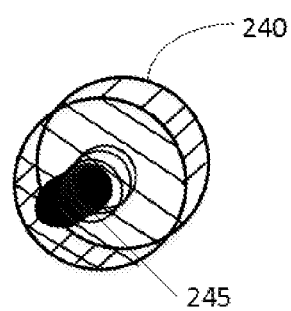
FIG. 6 is a simplified perspective view of a guided roller for use in the upper trolley body, in accordance with an embodiment of the present invention.

Reference is made to FIG. 6, which is a simplified perspective view of guided roller 240 for use in upper trolley body 210, in accordance with an embodiment of the present invention. FIG. 6 shows a spring-loaded guided roller pin 245, which engages in one of the protrusions 215 of upper trolley body 210, as roller 240 slides, to lock the trolley unit. Engagement of roller pin 245 serves to hold roller 240 in place, and to thereby hold scissor lift mechanism 230 in place at a desired height.

It will be appreciated by those skilled in the art that either one or both of guided rollers 240 in upper trolley body 210 may be equipped with spring-loaded guided roller pin 245, for engagement within one of the protrusions 215. If only one guided roller has a spring-loaded roller pin 245, then it is only necessary for upper trolley body 210 to have protrusions 215 for half of its extent. If both guided rollers have spring-loaded roller pins, then upper trolley body should have protrusions 215 for its full extent.

Release Mechanism

Figure 7:
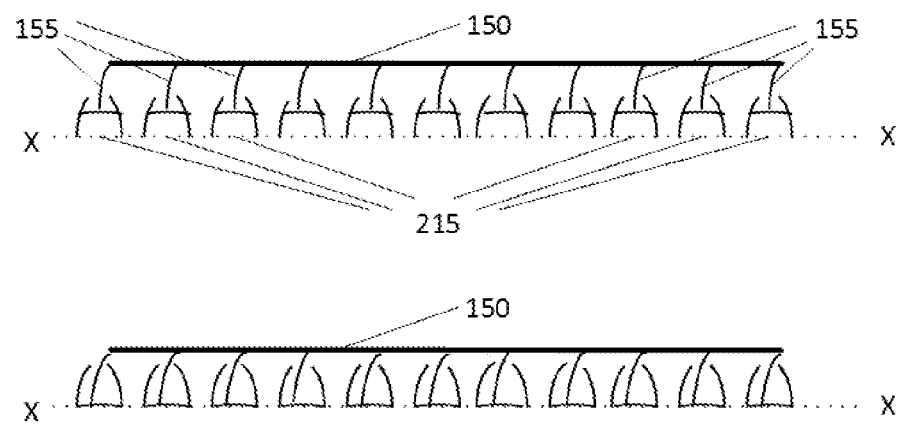
FIG. 7 is a simplified view of a shaft for releasing a guided roller pin from being engaged in a protrusion of an upper trolley body, in accordance with an embodiment of the present invention.

Reference is made to FIG. 7, which is a simplified view of a shaft 150 for releasing guided roller pin 245 from being engaged in a protrusion of upper trolley body 210, in accordance with an embodiment of the present invention. As shown in FIG. 7, protrusions 215 of upper trolley body 210 are pierced by small holes at their apex. Respective capped pins 155 are moved in and out of these small holes by shaft 150. When capped pins 155 move into these small holes, they eject roller pin 245 from whichever protrusion is it engaged in, thereby enabling roller 240 move freely, and thereby enabling scissor lift mechanism 230 to freely move up and down.

In accordance with an embodiment of the subject invention, lifting of release lever 140 mechanically causes shaft 150 to move from the position shown in the upper portion of FIG. 7 to the position shown in the lower portion of FIG. 7, and thereby disengages roller pin 245 from a protrusion, and enables scissor lift mechanism to freely move.

Figure 8:
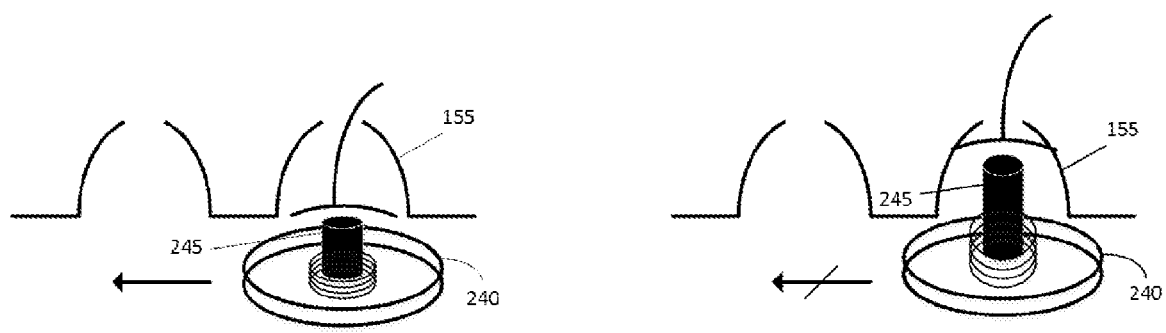
FIG. 8 is a simplified view of a guided roller pin in an engaged and in a disengaged position, in accordance with an embodiment of the present invention.
Figure 9:
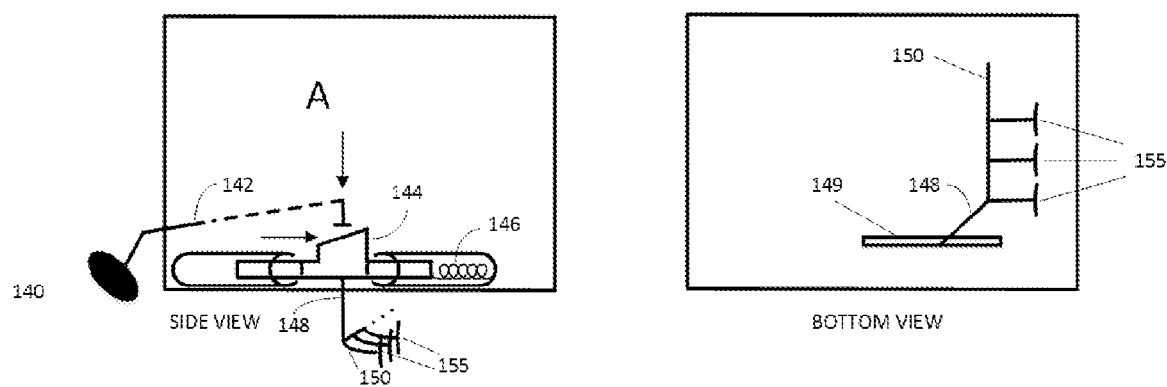
FIG. 9 is a simplified view, from the side and from the bottom of the luggage, of a release mechanism, for releasing a guided roller pin from its engaged position by means of a release lever, in accordance with an embodiment of the present invention.
Figure 10:
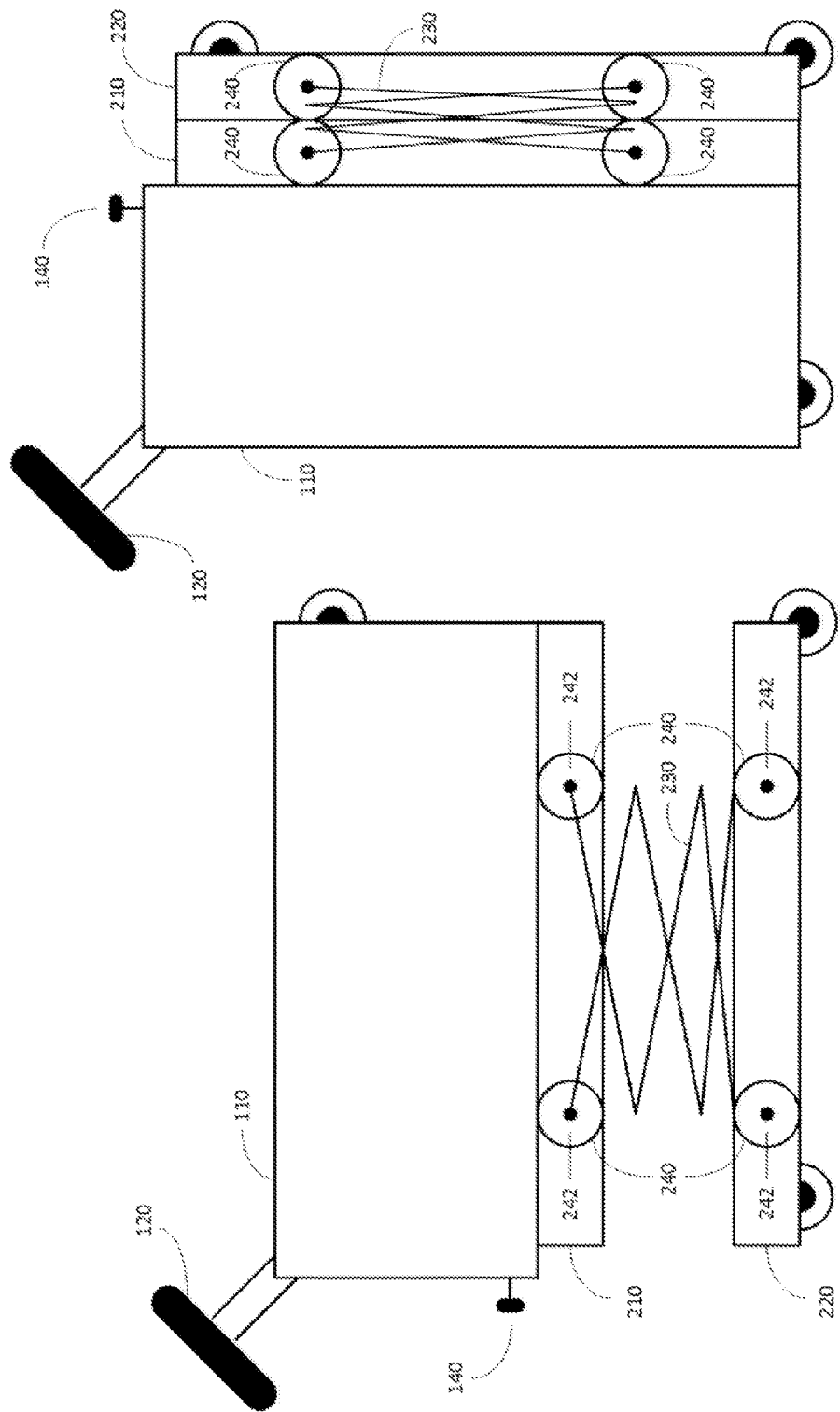
FIG. 10 is a simplified front view of luggage with an integrated trolley, in raised and lowered positions, in accordance with an alternate embodiment of the present invention.

Reference is made to FIG. 8, which is a simplified view of guided roller pin 245 in an engaged position with its spring uncompressed, at the right of FIG. 8, and in a disengaged position with its spring compressed, at the left of FIG. 8, in accordance with an embodiment of the present invention.

Reference is made to FIG. 9, which is a simplified view, from the side and from the bottom of the luggage, of a release mechanism, for releasing guided roller pin 245 from its engaged position by means of release lever 140, in accordance with an embodiment of the present invention. As shown in FIG. 9, when release lever 140 is lifted, rod 142 lowers onto an inclined plane of a slideable block 144. The force of rod 142 on the inclined plane causes block 144 to slide rightward. As block 144 moves to the right, a spring 146 is compressed. When release lever 140 is lowered, rod 142 is raised away from the inclined plane, and spring 146 causes block 144 to slide leftward, back to its rest position. Another rod 148 connects block 144 to shaft, so that sliding of block 144 to the right causes capped pins 155 to eject roller pin 245 from whatever protrusion it is engaged in, thereby unlocking lift mechanism 230.

Although rod 142 is contained within luggage 110, rod 148 extends out of luggage 110 through a small slit 149 at the bottom of luggage 110 that is sealed by block 144.

The portion of the release mechanism of FIG. 9 inside of luggage 110 is preferably situated within a covered portion at the bottom of the luggage, thus concealing it from the traveler. The portion of the release mechanism of FIG. 9 outside of luggage 110 is preferably situated within a covered portion of trolley unit 200, thus concealing it, too, from the traveler.

One having the benefit of the subject disclosure will appreciate that there are many variations of the integrated luggage and trolley of the subject invention. Thus, although the luggage and trolley described hereinabove are integrated in a purely mechanical fashion, they may alternatively be integrated using an electro-mechanical lock and release mechanism.

In an alternate embodiment of the present invention, one of the luggage wheels also functions as one of the trolley wheels. In this regard, reference is made to FIG. 10, which is a simplified front view of luggage with an integrated trolley, in raised and lowered positions, in accordance with this alternate embodiment of the present invention.

In another alternative embodiment of the present invention, the release mechanism may use a bar 143 inside handle 120 of the luggage, in which case release lever 140 is not required. In this regard, reference is made to FIG. 11, which is a simplified view, from the side and from the bottom of the luggage, of a release mechanism, for releasing a guided roller pin from its engaged position by means of a handle bar, in accordance with this alternate embodiment of the present invention.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A scissor lift for raising and lowering a heavy object, comprising:
   an upper platform for supporting a heavy object, comprising guided rollers mounted on axles;
   a lower frame comprising guided rollers mounted on axles;
   a scissor lift mechanism fastened to the axles of said upper platform guided rollers and to the axles of said lower frame guided rollers, that raises and lowers said upper platform;

a locking mechanism comprising protrusions protruding outward of said upper platform, each protrusion corresponding to a different height of said scissor lift mechanism, wherein at least one of the guided rollers within said upper platform comprises a spring-loaded pin for engagement in the protrusions, thereby locking said scissor lift mechanism into place at a height corresponding to the protrusion into which the spring-loaded pin is engaged; and a release mechanism that unlocks said scissor lift mechanism, comprising a shaft, outside of said upper platform, with capped pins that are bound within said protrusions and that move further into said protrusions, to disengage said spring-loaded pin from the protrusion into which said spring-loaded pin is engaged, when said shaft is pushed towards said upper platform.

2. The scissor lift of claim 1 wherein said upper platform comprises a slit through which a top portion of said scissor lift mechanism connects to the axles of said guided rollers in said upper platform.

3. The scissor lift of claim 1 wherein said release mechanism comprises a release lever that, when lifted, disengages said spring-loaded pin from the protrusion in which said spring-loaded pin is engaged, thereby unlocking said scissor lift mechanism.

4. The scissor lift of claim 3 wherein said release mechanism comprises:

a first rod inside said upper platform that moves downward when said release lever is lifted; and a second rod that extends outside of said upper platform through a slit in said upper platform, and that pushes said shaft towards said upper platform when said first rod moves downward.

5. The scissor lift of claim 4 wherein said release mechanism comprises a spring-loaded slideable block with an inclined plane, wherein said first rod presses on said inclined plane when said first rod moves downward, causing said block to slide in a first direction, wherein said second rod is connected to said block, and wherein the spring load of said block causes said block to slide in a direction opposite to the first direction when said first rod ceases to press on said inclined plane.

6. The scissor lift of claim 5 wherein said second rod slides in the first direction and in the opposite direction via the slit in said upper platform.

7. The scissor lift of claim 1 wherein said release mechanism comprises a bar in a handle that, when pushed downward, disengages said spring-loaded pin from the protrusion in which said spring-loaded pin is engaged, thereby unlocking said scissor lift mechanism.

8. The scissor lift of claim 7 wherein said release mechanism comprises a rod that extends outside of said upper platform through a slit in said upper platform, and that pushes said shaft towards said upper platform when said handle bar moves downward.

9. The scissor lift of claim 8 wherein said release mechanism comprises a spring-loaded slideable block with an inclined plane, wherein said handle bar presses on said inclined plane when said handle bar moves downward, causing said block to slide in a first direction, wherein said rod is connected to said block, and wherein the spring load of said block causes said block to slide in a direction opposite to the first direction when said handle bar ceases to press on said inclined plane.

10. The scissor lift of claim 9 wherein said rod slides in the first direction and in a direction opposite to the first direction via the slit in said upper platform.

* * * * *